Patented Apr. 28, 1925.

1,535,743

UNITED STATES PATENT OFFICE.

BURT C. STANNARD, OF BERKELEY, AND CALVIN W. HAFFEY, OF SELBY, CALIFORNIA, ASSIGNORS TO AMERICAN SMELTING AND REFINING COMPANY, OF NEW YORK, N. Y., A CORPORATION OF NEW JERSEY.

PROCESS OF SEPARATING ANTIMONY AND LEAD.

No Drawing.   Application filed November 12, 1921.   Serial No. 514,658.

*To all whom it may concern:*

Be it known that we, BURT C. STANNARD, a citizen of the United States, and a resident of Berkeley, in the county of Alameda and State of California, and CALVIN W. HAFFEY, a citizen of the United States, and a resident of Selby, in the county of Contra Costa and State of California, have invented certain new and useful Improvements in Processes of Separating Antimony and Lead, of which the following is a specification.

The invention relates broadly to a process for separating antimony in the form of a relatively pure antimony oxide from lead bullion and alloys for the purpose of softening and purifying the lead and of obtaining metallic antimony.

The bullion or matte obtained from the treatment of plumbiferous ores always contains in addition to the lead various other metals or compounds such as antimony, copper, arsenic, tin, bismuth and frequently more or less silver and gold. All of the known processes for separating the antimony and the lead, such as liquation, oxidation and cupellation produce a dross slag which rises to the top of the bath and is removed by skimming. Frequently a large number of skimmings must be taken off before the lead is sufficiently pure for commercial use, and relatively large quantities of lead are always enmeshed with the several skimmings which are recovered only at the cost of subsequent extensive treatment.

Our invention relates to a process whereby lead bullion containing a relatively high percentage of antimony may be treated to separate the greater part of the antimony without producing slag or dross in large quantity and without removing any appreciable amount of the lead until substantially all of the antimony above a relatively fixed minimum amount has been removed as a fume from the bath containing the impure bullion or alloy.

The invention also relates to a process whereby lead containing an amount of antimony in excess of the percentage heretofore considered commercially practical, may be treated to separate the antimony in a condition easily and economically reducible to metallic antimony in a practically pure state by promoting the separation of the antimony as a volatile oxide and at the same time retarding the formation of the stable and higher or pentoxide of antimony which appears as a slag or dross.

The invention also relates to the removal of copper from bullion or alloy containing lead and antimony in a condition practically free from antimony, since the copper may remain in the bath until practically all of the antimony has been removed in the form of either the stable or the instable oxide of antimony.

The invention further consists in the new and novel features of operation and the original arrangements and combinations of steps in the process hereinafter described and more particularly set forth in the claims.

According to our improved process the lead bullion or alloy to be treated containing, for example, from seventeen to twenty per cent of antimony, from four to five per cent of tin, from one to two per cent of copper, together with some gold, silver and perhaps small quantities of arsenic, is melted and raised rapidly to a bright red heat in an oxidizing atmosphere. The temperature may range from 1200° to 1700° F. depending somewhat on the composition of the bath.

First the tin is oxidized and is skimmed off as quickly as it is formed in appropriate quantities and preferably with as little disturbance to the surface of the bath as practical. The antimony and the lead begin to oxidize, the amount of fume tending to increase as the tin is removed. Any oxide of lead that is formed immediately combines with the metallic antimony present in the bath, so that the fume is practically pure oxide of antimony. When the tin content of the bath has been reduced to a relatively small amount,—for example, approximately one-half of one per cent, a thin antimony slag or skim then begins to appear on the surface of the bath. This antimony skim is limited in quantity and has an approximately fixed antimony content which does not vary appreciably with the amount of antimony in the bath at least within certain ranges, but is determined apparently by other factors. Preferably it is removed regularly in order to prevent interference with the continued rapid oxidation of the remaining antimony which continues to rise from the bath as a fume. The temperature of the bath is maintained at a point which will prevent liquation of the copper and will cause continuous and rapid oxidation of the antimony until litharge begins to appear on the surface of the bath.

Both the lead and the antimony appear to oxidize in direct proportion to the quantities of each contained in the surfaces exposed to the oxidizing agent or atmosphere. The reaction of the lead oxide or litharge that is formed is believed to be selective in its effect, and the litharge appears to act as a carrier of the oxygen, which, we believe, combines with any metallic antimony that may be present, but subsequently in the process, after the percentage of metallic antimony has been greatly reduced and the quantity of lead oxide or litharge correspondingly increased, it may combine with the instable or volatile oxide of antimony to form the higher or stable oxide of antimony.

After the total percentage of antimony in the bath has been lowered to about five to seven per cent, the antimony slag or dross begins to form much more rapidly and appears in greatly increased quantity. At this point the antimony fume still rises from the bath, although in reduced quantity, but as the percentage of antimony is gradually reduced by removal of the dross, the volume of the fume gradually decreases until it practically ceases when the percentage of antimony has been reduced approximately to three per cent. The remaining antimony is removed in the usual manner, solely by causing the formation of an antimony dross which is removed by skimming.

In actual operation an analysis of the contents of the bath taken at intervals shows a very rapid reduction of the antimony with rapid concentration but practically no loss of the lead and slight reduction of the copper and of the other impurities contained in the bullion or alloy,—for example, an analysis taken in actual operation after the tin skim had been removed and at the period when the antimony fume was beginning to pass off in its maximum volume was as follows:

| Au. | Ag. | Pb. | Cu. | Sb. | Sn. | As. |
|---|---|---|---|---|---|---|
| Ounces. | Ounces. | | | | | Per cent gal. |
| 3.40 | 476.6 | 78.6 | 1.3 | 17.3 | .35 | 1 |

After a period of treatment according to the process above set forth the analysis of the same charge was as follows:

| Au. | Ag. | Pb. | Cu. | Sb. | Sn. |
|---|---|---|---|---|---|
| Ounces. | Ounces. | | | | |
| 4.40 | 579.4 | 89.4 | 1.5 | 6.4 | .05 |

Analysis discloses a gradual enrichment of the bath in the gold, silver, copper and lead contents and a decrease of the antimony and similar metals, the antimony being removed largely by volatilization. Substantially all of the tin is removed as a tin slag and the antimony fume is practically free therefrom. Any copper that may be present in the bullion or alloy, however, is largely retained in the bath during the removal of the antimony owing to the relatively high temperature which is maintained throughout this stage of the process. After the antimony has been removed or reduced to the desired minimum, the temperature of the bath may be lowered thereby causing the copper to separate as a dross and rise to the surface, whence it is removed in the usual manner.

After the copper has been removed, the final steps in the refining of the lead and the recovery of the contained precious metals may be carried out in any well known manner.

Preferably a reverberatory furnace of standard construction is used for carrying out our process, although it is obvious that any form of furnace employed for the softening of lead may be utilized. The antimony fume which separates from the bath is collected and condensed in flues or in a bag house or in any other well known manner. The product recovered is a commercial oxide of antimony that is unusually free from impurities. If desired, this oxide may be reduced to metallic antimony or other commercial products may be derived therefrom, such as antimony sulphide and others.

By our improved process practically pure antimony in commercial form may be recovered directly from lead bullion having a relatively high antimony content. This is accomplished by taking advantage of the selective action of litharge as formed in the bath, due to the fact not heretofore recognized that the greater part of the antimony in excess of a relatively small and practically fixed percentage would separate as a fume. Antimony dross or slag formed in the usual manner carries over from two to four times as much lead as antimony, and it has been assumed that this ratio applied in all proportions between the two metals. In order to produce an antimony dross or skim it has been considered necessary to have a large excess of lead and under many circumstances it has been customary to add refined lead or litharge to the bath in order to facilitate the formation of the antimony dross within a reasonable time. Consequently it has not been considered practical heretofore within economic limits to soften lead bullion containing antimony in excess of five or six per cent. By our process the maximum percentage of antimony is immaterial and bullion or alloys containing from ten to thirty per cent or more of antimony are treated readily and successfully. Some dross is produced by our process, but it is relatively insignificent in amount. Instead of dross we obtain a commercial antimony product of a high degree of purity which is produced rapidly and in large quantities directly from the softening bath. The losses incidental to the formation of stable oxides of antimony and their removal from the bath as antimony skimmings, together with the additional cost necessitated by subsequent treatment to remove impurities and recover values are almost entirely avoided. Also any copper that may be contained in the bullion is recovered practically free from antimony compounds, whereby expensive steps in its subsequent treatment are avoided with a substantial saving in cost.

Having thus described our invention, we claim:

1. The process of recovering commercially pure antimony oxide directly from lead bullion containing antimony in excess of a relatively fixed percentage that forms a stable oxide of antimony in quantity in the presence of lead, which consists in melting the bullion, heating the bath under oxidizing conditions to an appropriate temperature to effect continuous volatilization of the excess antimony, and maintaining said temperature until substantially all of the excess antimony is removed from the bath as a fume.

2. The process of removing antimony from lead which consists in treating lead bullion containing a high percentage of antimony under oxidizing conditions at an appropriate temperature above a red heat to effect continuous rapid oxidation and volatilization of the antimony, and maintaining such appropriate temperature until a substantial portion of the antimony content passes off as a fume consisting of commercial antimony oxide.

3. The process of treating lead bullion containing relatively high percentages of antimony to recover oxide of antimony substantially free from lead, which consists in heating the bullion under oxidizing conditions to a temperature above a red heat sufficient to cause rapid continuous oxidation of the antimony until substantially all of the antimony in excess of a relatively fixed percentage not exceeding 7 per cent is removed as a fume, and collecting said fume.

4. The process of recovering oxide of antimony of commercial purity from lead bullion containing relatively high percentages of antimony, which consists in heating the bullion under oxidizing conditions to an appropriate temperature above a red heat to cause continuous separation of the antimony from the bath as a fume substantially free from lead, and maintaining said temperature until the antimony is reduced to approximately 5 per cent without forming antimony dross in substantial amount.

5. The process of treating lead bullion containing antimony in excess of 5 per cent to recover oxide of antimony substantially free from lead, which consists in heating the bullion to an appropriate temperature under oxidizing conditions to remove substantially all of the excess antimony as a fume, then maintaining an appropriate temperature simultaneously to volatilize and dross the antimony until the antimony content is reduced to approximately 3 per cent, and removing the remaining portion of the antimony as a dross.

6. In the art of treating impure lead bullion containing tin and a relatively high percentage of antimony, which consists in melting the bullion, oxidizing the tin and removing the same from the bath as a dross, heating the bath under oxidizing conditions to an appropriate temperature to produce continuous oxidization and volatilization of the antimony in the form of a fume substantially free from lead, maintaining said temperature until the antimony content is reduced below 7 per cent, and collecting said fume.

7. In the art of treating impure lead bullion containing tin, antimony and copper, the process which consists in melting the bullion, oxidizing substantially all of the tin and removing the same as a dross, maintaining the bath at an appropriate temperature and under oxidizing conditions to form a volatile oxide of antimony free from oxides of tin and lead until the antimony is reduced to approximately 5 per cent, oxidizing the remaining portion of the antimony at an appropriate temperature to form a dross, then reducing the temperature of the bath to cause the liquation of the copper, and separating the lead and the copper.

8. The process of treating lead containing copper and antimony which consists in melting the material to be treated, maintaining the bath above 1200° F., removing under oxidizing conditions substantially all of the antimony in excess of seven per cent as a volatile oxide in the form of a fume, removing the remaining portion of the antimony as a stable oxide in the form of a slag and then cooling the bath to separate the copper as a dross.

9. The process of treating bullion or alloys containing lead and antimony which consists in heating the same to a temperature above 1200° F. in an oxidizing atmosphere, oxidizing substantially all of the antimony in excess of five per cent to form a fume, oxidizing the remaining portion of the antimony to a stable oxide and removing said stable oxide from the surface of the bath.

10. In the art of treating impure bullion containing lead, tin and antimony the process which consists in melting the bullion, heating the bath to temperature above 1200° F. in an oxidizing atmosphere, causing the tin to separate as a dross until the percentage of tin is less than one per cent, maintaining the bath at an appropriate temperature and under oxidizing conditions to form a volatile oxide of antimony and causing the same to separate from the bath as a fume free from oxides of tin and lead.

11. In the art of treating impure bullion containing lead, tin, antimony and copper the process which consists in melting the bullion, heating the bath to a temperature above 1200° F. in an oxidizing atmosphere, causing the tin to separate as a dross until the percentage of tin is less than one per cent, maintaining the bath at an appropriate temperature and under oxidizing conditions to form a volatile oxide of antimony and causing the same to separate from the bath as a fume free from oxides of tin and lead until the antimony content is reduced approximately to 5 per cent, oxidizing and removing substantially all of the remaining portion of the antimony as a dross, reducing the temperature of the bath to cause liquation of the copper and separating the lead and the copper.

12. The process of removing antimony from lead containing relatively large percentages of antimony, which consists in melting the metal under oxidizing conditions, maintaining the bath at or above a litharge producing temperature, utilizing the litharge to oxidize the antimony to a volatile oxide, the formation of excessive amounts of dross of litharge and antimony being thereby limited, and removing the volatile antimony oxide in the form of a fume as it is formed.

Signed at Crockett, in the county of Contra Costa and State of California, this 3rd day of November, A. D. 1921.

BURT C. STANNARD.
CALVIN W. HAFFEY.